(12) United States Patent
Wang

(10) Patent No.: US 12,580,841 B2
(45) Date of Patent: Mar. 17, 2026

(54) ELECTRONIC DEVICE AND MODE SWITCHING METHOD

(71) Applicant: Lenovo (Beijing) Limited, Beijing (CN)

(72) Inventor: Hongyu Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 384 days.

(21) Appl. No.: 18/459,120

(22) Filed: Aug. 31, 2023

(65) Prior Publication Data

US 2024/0113958 A1 Apr. 4, 2024

(30) Foreign Application Priority Data

Sep. 30, 2022 (CN) .......................... 202211230496.2

(51) Int. Cl.
*H04L 45/12* (2022.01)

(52) U.S. Cl.
CPC .................................... *H04L 45/12* (2013.01)

(58) Field of Classification Search
CPC .......... H04L 45/12; H04L 45/28; H04L 45/24
See application file for complete search history.

(56) References Cited

U.S. PATENT DOCUMENTS

| | | | | | |
|---|---|---|---|---|---|
| 9,806,910 | B2 * | 10/2017 | Ryu | ..................... | H04L 12/4625 |
| 9,941,968 | B2 * | 4/2018 | Yu | ......................... | H04B 1/0007 |
| 2017/0039155 | A1 * | 2/2017 | Feng | ................... | G06F 13/4282 |

* cited by examiner

*Primary Examiner* — Rasheed Gidado
(74) *Attorney, Agent, or Firm* — ANOVA LAW GROUP, PLLC

(57) ABSTRACT

An electronic device includes a first interface, a first network unit, a second interface, a second network unit, a transmission unit, a first switch unit, and a third interface. The first interface is connected to a first external device and configured to transmit first data. The first network unit is connected to the first interface and configured to convert a first portion of the first data and network data. The second interface is connected to a second external device and configured to transmit second data. The second network unit is connected to the second interface and configured to convert a first portion of the second data and the network data. The transmission unit transmits the network data with the first network unit and the second network unit. The first switch unit transmits the network data with the transmission unit and the first network unit.

17 Claims, 16 Drawing Sheets

S1701

Obtain a switch signal

S1702

Based on the switch signal, control the first switch unit of the electronic device to cause the electronic device to at least switch between the first mode and the second mod

ELECTRONIC DEVICE AND MODE SWITCHING METHOD

CROSS-REFERENCE TO RELATED APPLICATION

The present disclosure claims priority to Chinese Patent Application No. 202211230496.2, filed on Sep. 30, 2022, the entire content of which is incorporated herein by reference.

TECHNICAL FIELD

The present disclosure relates to the control technology field and, more particularly, to an electronic device and a mode switching method.

BACKGROUND

A networked device is used as an intermediate device in a network. The networked device is connected to a plurality of external devices and is configured to provide the network access to the plurality of external devices.

The networked device can be connected to the plurality of external devices. However, a switch unit of the networked device is configured to switch the network between two external devices, which only satisfies a networking requirement of a single external device and causes other connected external devices to be unable to access the network.

SUMMARY

Embodiments of the present disclosure provide an electronic device, including a first interface, a first network unit, a second interface, a second network unit, a transmission unit, a first switch unit, and a third interface. The first interface is connected to a first external device and configured to transmit first data. The first network unit is connected to the first interface and configured to convert a first portion of the first data and network data. The second interface is connected to a second external device and configured to transmit second data. The second network unit is connected to the second interface and configured to convert a first portion of the second data and the network data. The transmission unit transmits the network data with the first network unit and the second network unit. The first switch unit transmits the network data with the transmission unit and the first network unit. The third interface is connected to the first switch unit and configured to be connected to a network device. The electronic device has at least a first mode and a second mode. In response to the electronic device being in the first mode, the first switch unit transmits the network data with the first network unit and the second network unit through the transmission unit to allow the first external device and the second external device to be connected to the network device. In response to the electronic device being in the second mode, the first switch unit transmits the network data with the first network unit without through the transmission unit to allow the first external device to be connected to the network device, while the second external device cannot be connected to the network device.

Embodiments of the present disclosure provide a mode switching method. The method includes obtaining a switching signal and based on the switching signal, controlling a first switch unit of an; electronic device to allow the electronic device to be switched between a first mode and a second mode. The electronic device at least has a first mode and a second mode. In response to the electronic device being in the first mode, the first switch unit transmits network data with a first network unit through a transmission unit to allow a first external device and a second audio device to be connected to a network device. In response to the electronic device being in the second mode, the first switch unit transmits the network data with the first network unit without through the transmission unit to allow the first external device to be connected to the network device, while the second external device is not connected to the network device.

DETAILED DESCRIPTION OF THE EMBODIMENTS

The technical solutions of embodiments of the present disclosure are described in detail below in connection with the accompanying drawings. Described embodiments are merely some embodiments of the present disclosure, not all embodiments. Based on embodiments of the present disclosure, all other embodiments obtained by those of ordinary skill in the art without creative effort are within the scope of the present disclosure.

Figure 1:
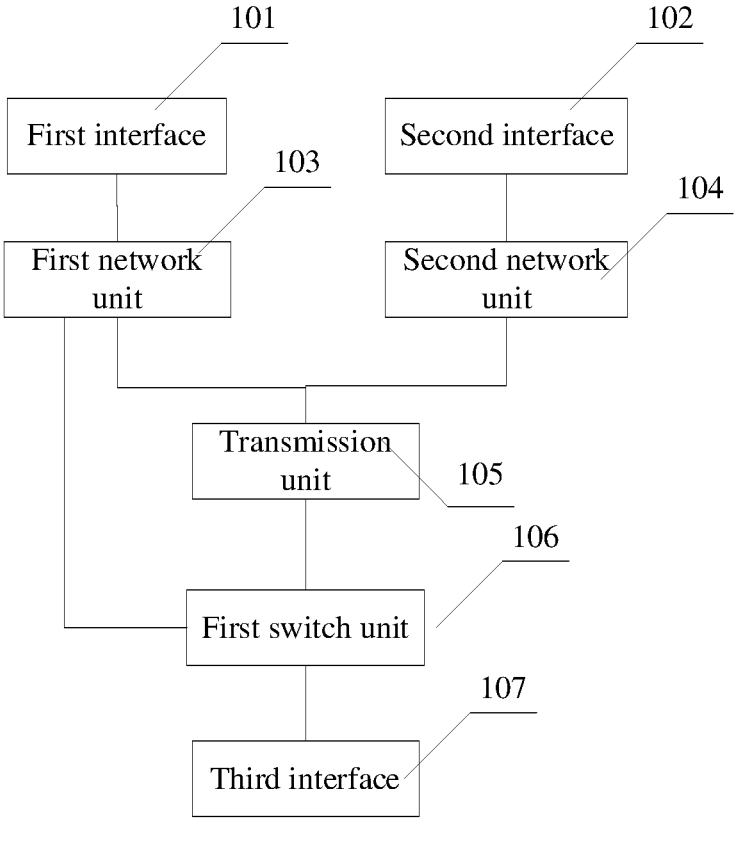
FIG. 1 illustrates a schematic structural diagram of an electronic device according to some embodiments of the present disclosure.

FIG. 1 illustrates a schematic structural diagram of an electronic device according to some embodiments of the present disclosure. The electronic device includes a first interface 101, a second interface 102, a first network unit 103, a second network unit 104, a transmission unit 105, a first switch unit 106, and a third interface 107.

The first interface 101 can be connected to a first external device to transmit first data.

The first network unit 103 can be connected to the first interface and configured to convert a first portion of the first data and network data.

The second interface 102 can be connected to a second external device for transmitting second data.

The second network unit 104 can be connected to the second interface and configured to convert a first portion of the second data and network data.

The transmission unit 105 can be configured to transmit the network data with the first network unit and the second network unit.

The first switch unit 106 can be configured to transmit the network data with the transmission unit and the first network unit.

The third interface 107 can be connected to the first switch and configured to be connected to a network device.

The electronic device can at least include a first mode and a second mode.

If the electronic device is in the first mode, the first switch unit can transmit the network data with the first network unit and the second network unit through the transmission unit to allow the first external device and the second external device to be connected to the network device.

If the electronic device is in the second mode, the first switch unit can transmit the network data with the first network unit without through the transmission unit to allow the first external device to be connected to the network device, while the second external device cannot be connected to the network device.

The first interface and the second interface can adopt interfaces with the same transmission protocol or different transmission protocols.

The first network unit can include a switch function. The first network unit can be configured to control connection and disconnection between the first switch unit and the transmission unit and the first network unit.

When the electronic device is in the first mode, the first switch unit can be connected to the first network unit through the transmission unit, and the first network unit can be switched to be connected to the transmission unit. When the electronic device is in the second mode, the first network unit can be switched to be connected to the first switch unit to realize the connection between the first switch unit and the first network unit.

In some embodiments, the first interface can adopt any one of various transmission protocols such as Universal Serial Bus (USB) type B, USB type C, etc. The second interface can adopt any one of various transmission protocols such as USB type B, USB type C, etc.

The network device can be configured to provide network data to the electronic device.

When the electronic device is in the first mode, the first external device and the second external device can be connected to the network device through the electronic device and can receive the network data. When the electronic device is in the second mode, the first external device can be connected to the network device through the electronic device, while the second external device cannot be connected to the network device through the electronic device.

The electronic device can be configured to establish different transmission channels between the external devices and the network device in different modes.

Figure 2:
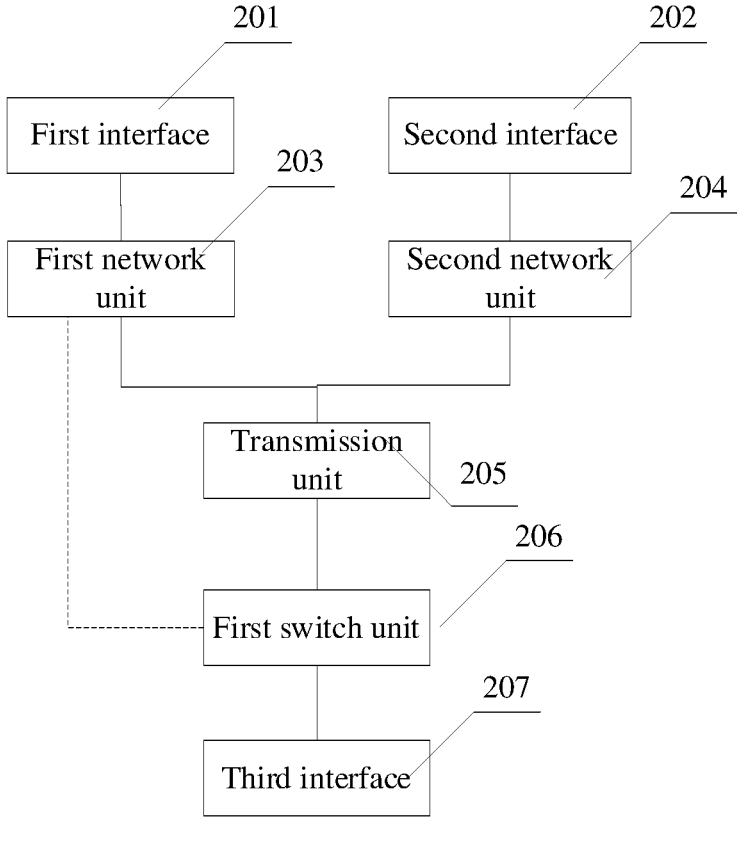
FIG. 2 illustrates a schematic diagram showing a data transmission path when the electronic device is in a first mode according to some embodiments of the present disclosure.

FIG. 2 illustrates a schematic diagram showing a data transmission path when the electronic device is in a first mode according to some embodiments of the present disclosure. The electronic device includes a first interface 201, a second interface 202, a first network unit 203, a second network unit 204, a transmission unit 205, a first switch unit 206, and a third interface 207. When the electronic device is in the first mode, the first switch unit can be connected to the third interface and the transmission unit to allow the third interface, the first switch unit, the transmission unit, the first network unit, and the second network unit to be communicated with the first interface and the second interface. Thus, the network data of the network device can be transmitted to the first external device and the second external device through the above structure. As shown in FIG. 2, thin and solid lines represent the data transmission path.

Figure 3:
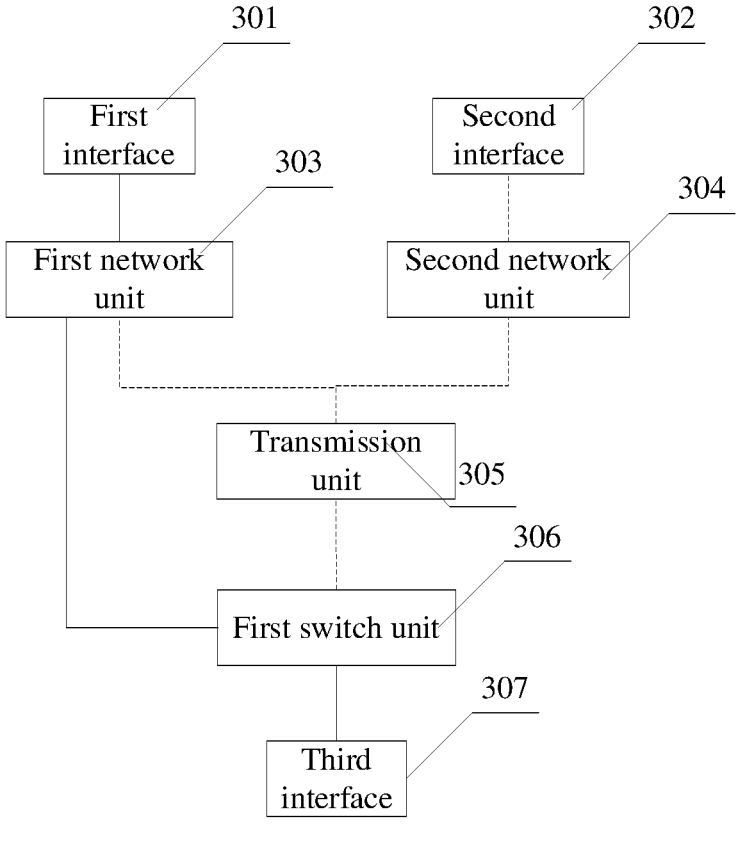
FIG. 3 illustrates a schematic diagram showing a data transmission path when the electronic device is in a second mode according to some embodiments of the present disclosure.

FIG. 3 illustrates a schematic diagram showing a data transmission path when the electronic device is in a second mode according to some embodiments of the present disclosure. The electronic device includes a first interface 301, a second interface 302, a first network unit 303, a second network unit 304, a transmission unit 305, a first switch unit 306, and a third interface 307. When the electronic device is in the second mode, the first switch unit can be connected to the third interface and the first network unit to allow the third interface, the first switch unit, and the first network unit to be communicated with the first interface. Thus, the data of the network device can be transmitted to the first external device connected to the first interface through the above structure. Since the first switch unit does not communicate with the transmission unit, the second network unit corresponding to the second external device cannot be connected to the third interface indirectly. Therefore, the data of the network device cannot be transmitted to the second external device. As shown in FIG. 3, thin and solid lines represent the data transmission path.

When the electronic device is in the first mode, the first external device and the second external device are connected to the electronic device through the first interface and the second interface can receive the network data of the network device through the electronic device. When the electronic device is in the second mode, only the first external device can receive the network data of the network device through the electronic device, while the second external device cannot receive the network data of the network device through the electronic device.

In some embodiments, an application environment of the electronic device can have relatively high requirements for network safety. To avoid that some operations cannot be determined to be performed by which external device, the electronic device can be prohibited from transmitting the network data to two or more external devices. Then, the electronic device can be switched to the second mode, such that the transmission unit can stop transmitting the network data. Only the first external device can receive the network data to avoid the situation where the server of the application environment where the electronic device prohibits the electronic device from receiving the network data.

If the application environment of the electronic device does not have high requirements for network safety, the electronic device can be allowed to transmit the network data to a plurality of external devices. Then, the electronic device can be controlled to be switched to the first mode. Thus, the transmission unit of the electronic device can transmit the network data to the network units corresponding to the two external devices. Therefore, the electronic device can transmit the network data to the two external devices.

In summary, embodiments of the present disclosure provide the electronic device. The electronic device can be connected to the network device via the third interface. The first switch unit can be configured to transmit the network data to the first network unit and the second network unit. The first network unit can be connected to the first external device through the first interface. The second network unit can be connected to the second external device through the second interface. When the electronic device is in different modes, based on different units connected to the first switch unit, the two external devices can be connected to the network device or only the first external device can be connected to the network device. In embodiments of the present disclosure, the electronic device can realize the network connection requirement of a single external device or the plurality of external devices by switching the mode.

Figure 4:
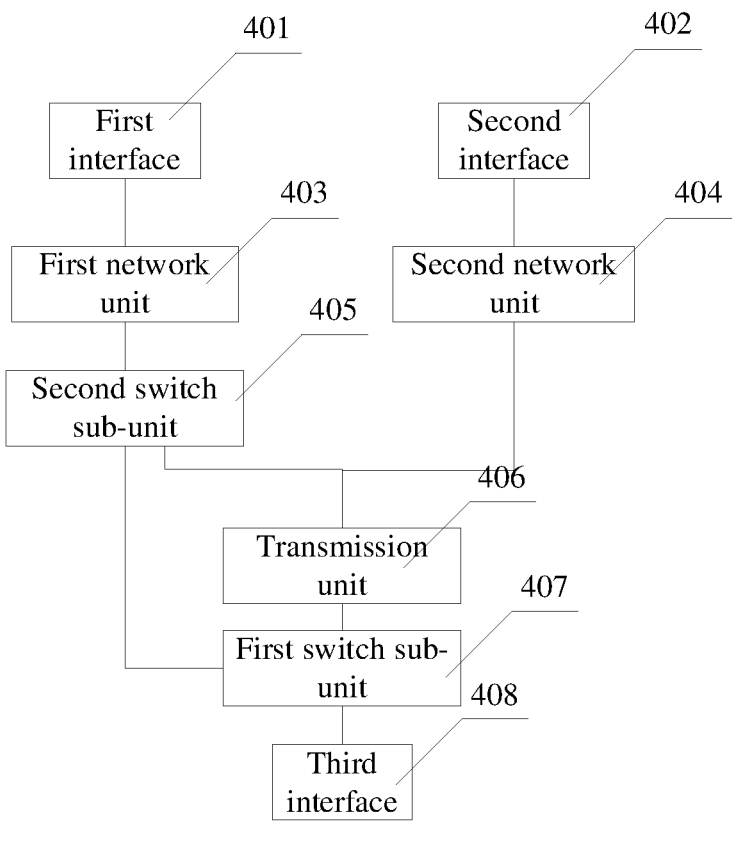
FIG. 4 illustrates a schematic structural diagram of an electronic device according to some embodiments of the present disclosure.

FIG. 4 illustrates a schematic structural diagram of an electronic device according to some embodiments of the present disclosure. The electronic device includes a first interface 401, a second interface 402, a first network unit 403, a second network unit 404, a second switch unit 405, a transmission unit 406, a first switch unit 407, and a third interface 408.

Functions of the first interface 401, the second interface 402, the first network unit 403, the second network unit 404, the transmission unit 406, the first switch unit 407, and the third interface 408 can be consistent with the corresponding structural functions above, which are not repeated here.

With the transmission unit, the first switch unit, and the first network unit, the second switch unit 405 can be configured to transmit the network data.

If the electronic device is in the first mode, the first switch unit can transmit the network data with the first network unit through the transmission unit and the second switch unit. The first switch unit can transmit the network data with the second network unit through the transmission unit to allow the first external device and the second external device to be connected to the network device.

If the electronic device is in the second mode, the first switch unit can transmit the network data with the first network unit through the second switch unit not through the transmission unit to allow the first external device to be connected to the network device, while the second external device cannot be connected to the network device.

In embodiments of the present disclosure, the second switch unit can be an independent unit configured to realize a switch function of the first network unit. Through the second switch unit, the first network unit can be switched between being communicated with the first switch unit or the transmission unit.

The second switch unit can be arranged between the first switch unit and the first network unit.

The second switch unit can be connected to the first switch unit, the transmission unit, and the first network unit. The second switch unit can control the first network unit to transmit the network data with one of the first switch unit and the transmission unit. In cooperation with the first switch unit, the second switch unit can control different connection methods of the units when the electronic device is in the first mode or the second mode.

Figure 5:
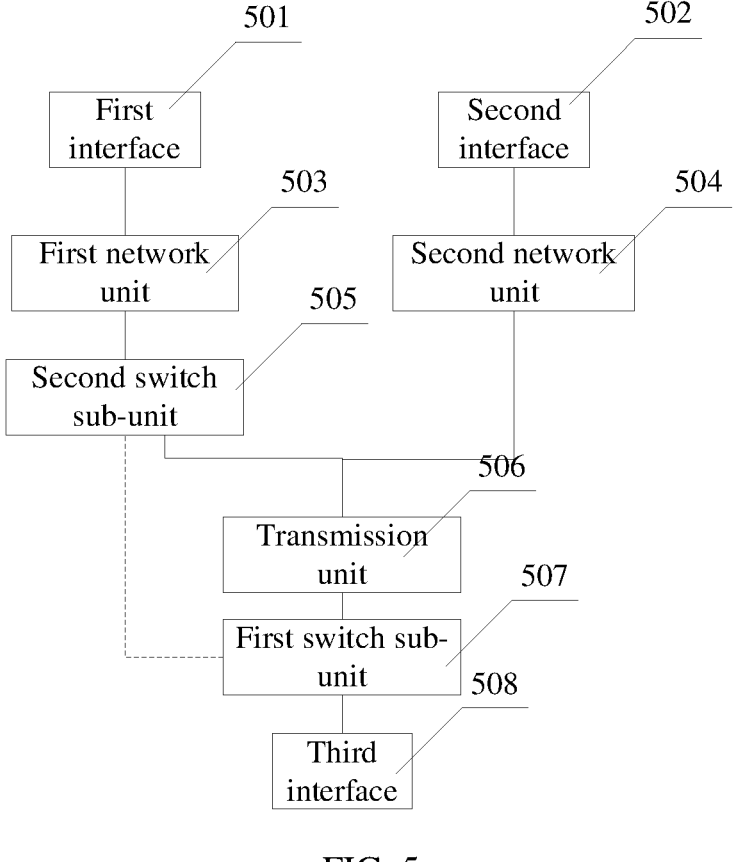
FIG. 5 illustrates a schematic diagram showing a data transmission path when the electronic device is in a first mode according to some embodiments of the present disclosure.

FIG. 5 illustrates a schematic diagram showing a data transmission path when the electronic device is in a first mode according to some embodiments of the present disclosure. The electronic device includes a first interface 501, a second interface 502, a first network unit 503, a second network unit 504, a second switch unit 505, a transmission unit 506, a first switch unit 507, and a third interface 508. When the electronic device is in the first mode, the first switch unit can communicate with the third interface and the transmission unit. The second switch unit can communicate with the transmission unit and the first network unit. Thus, an information transmission path between the third interface and the first interface can be composed of the first switch unit, the transmission unit, the second switch unit, and the first network unit. The network device connected to the third interface can be ensured to be connected to the first external device connected to the first interface. Moreover, when the electronic device is in the first mode, the information transmission path between the third interface and the second interface can be composed of the first switch unit, the transmission unit, and the second network unit. Thus, the network device connected to the third interface can be ensured to be connected to the second external device connected to the second interface. As shown in FIG. 5, thin and solid lines represent the data transmission path.

When the electronic device is in the first mode, if the transmission unit is unable to transmit data, the network data transmitted by the first switch unit cannot be transmitted to the first network unit and the second network unit through the transmission unit. Thus, the two external devices cannot receive the network data. Thus, the electronic device can be controlled to be switched to the second mode. Structures connected to the first switch unit can be switched from the third interface and the transmission unit to the third interface and the second switch unit. Units connected to the second switch unit can be switched from the transmission unit and the first network unit to the first switch unit and the first network unit. The transmitted network data can be transmitted to the first external device connected to the first interface through the second switch unit and the first network unit. Thus, at least one of the external devices connected to the electronic device can receive the network data.

Figure 6:
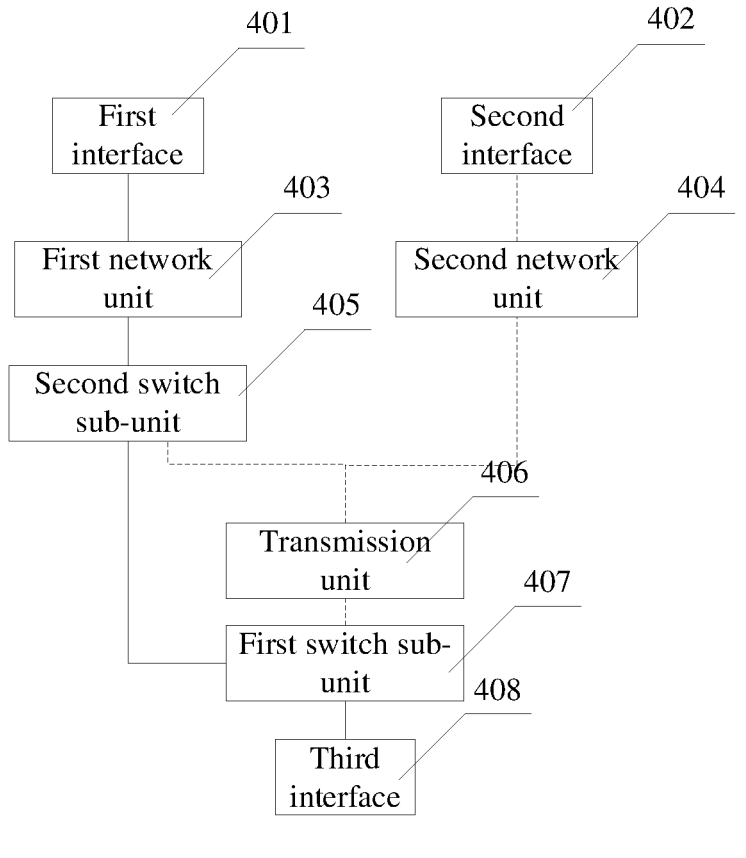
FIG. 6 illustrates a schematic diagram showing a data transmission path when the electronic device is in a second mode according to some embodiments of the present disclosure.

FIG. 6 illustrates a schematic diagram showing a data transmission path when the electronic device is in a second mode according to some embodiments of the present disclosure. The electronic device includes a first interface 601, a second interface 602, a first network unit 603, a second network unit 604, a second switch unit 605, a transmission unit 606, a first switch unit 607, and a third interface 608. The first switch unit can communicate with the third interface and the second switch unit. The second switch unit can communicate with the first switch unit and the first network unit. Thus, the information transmission path between the third interface and the first interface can be composed of the first switch unit, the second switch unit, and the first network unit, which ensures that the network device connected to the third interface is connected to the first external device connected to the first interface. Thus, the data of the network device can be transmitted to the first external device connected to the first interface through the above structure. As shown in FIG. 6, thin and solid lines represent the data transmission path.

In summary, the electronic device of embodiments of the present disclosure further includes the second switch unit capable of transmitting the network data with the transmission unit, the first switch unit, and the first network unit. When the electronic device is in different modes, the second switch unit can cooperate with the first switch unit to establish different path transmission paths between the network device and the external devices. Thus, the two external devices can be connected to the network device, or only the first external device can be connected to the network device. In embodiments of the present disclosure, the electronic device can realize the network connection requirements of the single external device and the network connection requirements of the plurality of external devices.

Figure 7:
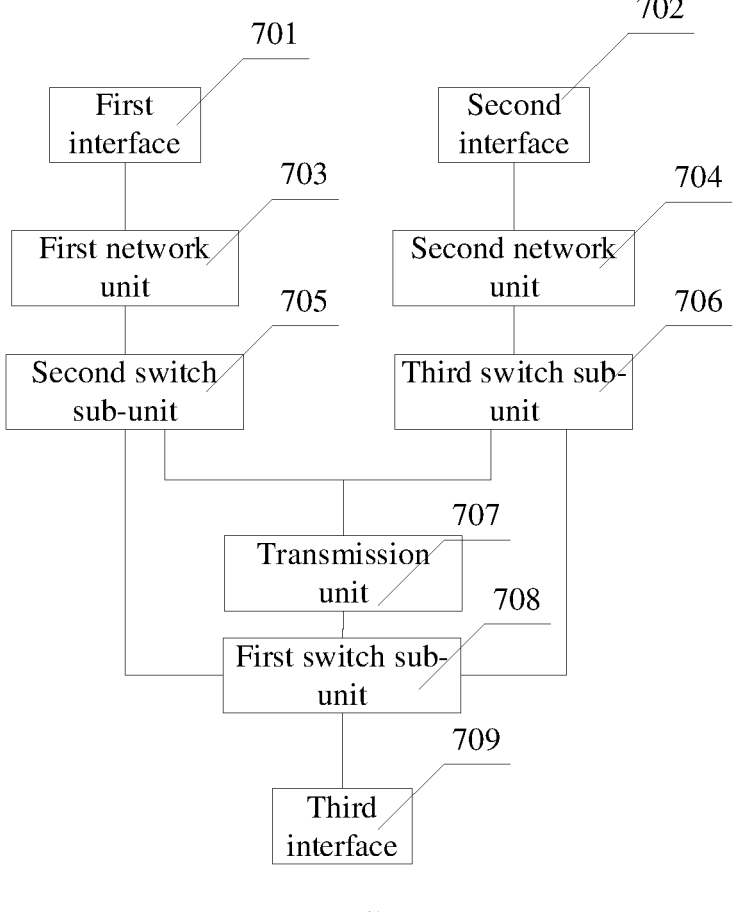
FIG. 7 illustrates a schematic structural diagram of an electronic device according to some embodiments of the present disclosure.

FIG. 7 illustrates a schematic structural diagram of an electronic device according to some embodiments of the present disclosure. The electronic device includes a first interface 701, a second interface 702, a first network unit 703, a second network unit 704, a second switch unit 705, a third switch unit 706, a transmission unit 707, a first switch unit 708, and a third interface 709.

Functions of the first interface 701, the second interface 702, the first network unit 703, the second network unit 704, the second switch unit 705, the transmission unit 707, the first switch unit 708, and the third interface 709 can be consistent with the corresponding structural functions above, which are not repeated here.

The third switch unit 706 can transmit the network data with the transmission unit, the first switch unit, and the second network unit.

The electronic device can also have a third mode.

If the electronic device is in the first mode, the first switch unit can transmit the network data with the first network unit through the transmission unit and the second switch unit. The first switch unit can transmit the network data with the second network unit through the transmission unit and the third switch unit. Thus, the first external device and the second external device can be connected to the network device.

If the electronic device is in the third mode, the first switch unit can transmit the network data with the second network unit through the transmission unit and the third switch unit. The first switch unit and the transmission unit cannot transmit the network data with the first network unit through the second switch unit. Thus, the second external device can be connected to the network device, and the first device cannot be connected to the network device.

The third switch unit can be arranged between the first switch unit and the second network unit.

The third switch unit can be connected to the first switch unit, the transmission unit, and the second network unit. The third switch unit can control the second network unit to transmit the network data with one of the first switch unit and the transmission unit. The third switch unit can cooperate with the first switch unit to control the different connection methods of the units when the electronic device is in the first mode or the third mode.

When the electronic device is in the first mode, the first external device and the second external device can be connected to the network device through the electronic device and can receive the network data. When the electronic device is in the third mode, the second external device can be connected to the network device through the electronic device, and the first external device cannot be connected to the network device through the electronic device.

Figure 8:
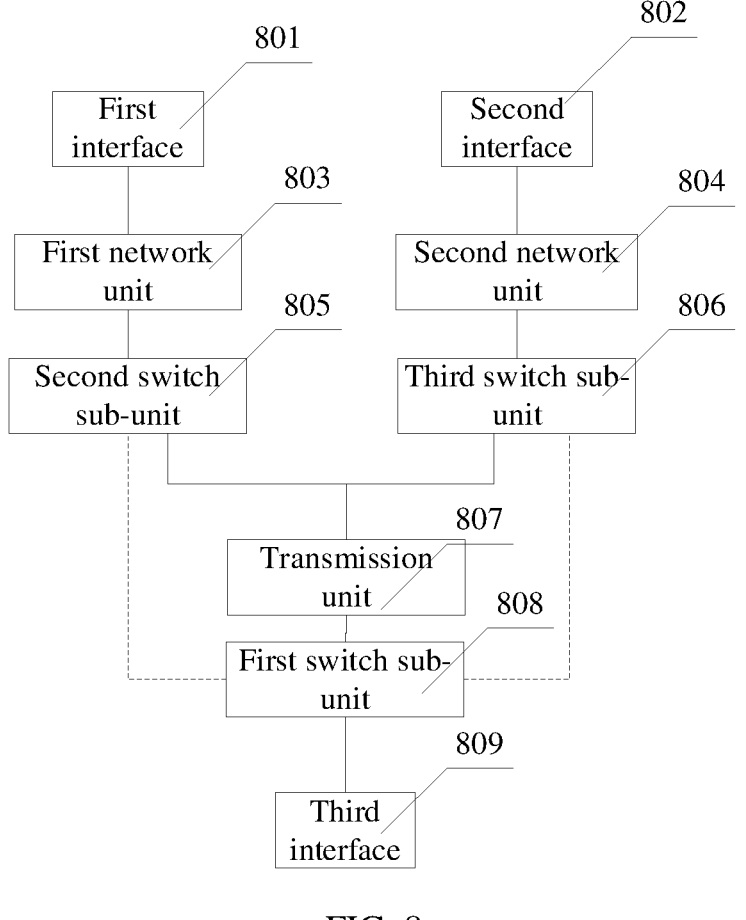
FIG. 8 illustrates a schematic diagram showing a data transmission path when the electronic device is in a first mode according to some embodiments of the present disclosure.

FIG. 8 illustrates a schematic diagram showing a data transmission path when the electronic device is in the first mode according to some embodiments of the present disclosure. The electronic device includes a first interface 801, a second interface 802, a first network unit 803, a second network unit 804, a second switch unit 805, a third switch unit 806, a transmission unit 807, a first switch unit 808, and a third interface 809. When the electronic device is in the first mode, the first switch unit can communicate with the third interface and the transmission unit, the second switch unit can communicate with the transmission unit and the first network unit, and the third switch unit can communicate with the transmission unit and the second network unit. Thus, the information transmission path between the third interface and the first interface can be composed of the first switch unit, the transmission unit, the second switch unit, and the first network unit, which ensures that the network device connected to the third switch unit can be connected to the first external device connected to the first interface. When the electronic device is in the first mode, the information transmission path between the third interface and the second interface can be composed of the first switch unit, the transmission unit, the third switch unit, and the second network unit, which ensures that the network device connected to the third interface can be connected to the second external device connected to the second interface. As shown in FIG. 8, thin and solid lines represent the data transmission path.

When the electronic device is in the first mode, if the transmission unit is unable to transmit data, the network data transmitted from the first switch unit cannot be transmitted to the first network unit and the second network unit through the transmission unit. The second external device can have a higher priority level for using the network data than the first external device. Thus, the electronic device can be controlled to be switched to the third mode. The structure connected to the first switch unit can be switched from the third interface and the transmission unit to the third interface and the third switch unit, and the structure connected to the third switch unit can be switched from the transmission unit and the second network unit to the first switch unit and the second network unit. The transmitted network data can be transmitted to the second external device connected to the second interface through the third switch unit and the second network unit to ensure that at least one of the external devices connected to the electronic device can receive the network data.

Figure 9:
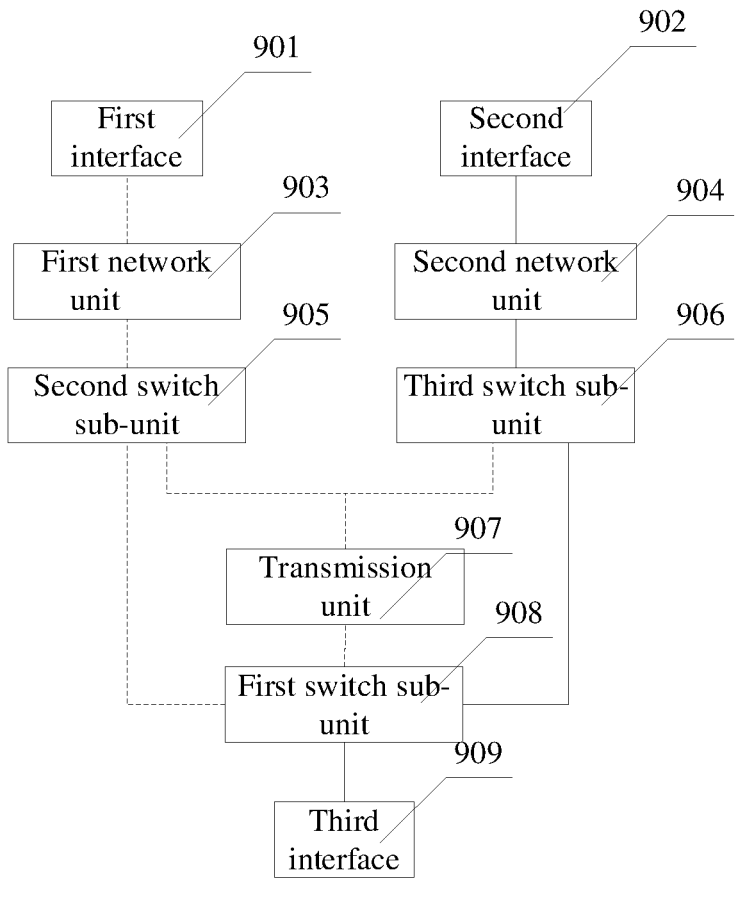
FIG. 9 illustrates a schematic diagram showing a data transmission path when the electronic device is in a third mode according to some embodiments of the present disclosure.

FIG. 9 illustrates a schematic diagram showing a data transmission path when the electronic device is in the third mode according to some embodiments of the present disclosure. The electronic device includes a first interface 901, a second interface 902, a first network unit 903, a second network unit 904, a second switch unit 905, a third switch unit 906, a transmission unit 907, a first switch unit 908, and a third interface 909. The first switch unit can communicate with the third interface and the third switch unit. The third switch unit can communicate with the first switch unit and the second network unit. The information transmission path between the third interface and the second interface can be composed of the first switch unit, the third switch unit, and the second network unit, which ensures that the network device connected to the third interface is connected to the second external device connected to the second interface. Thus, the data of the network device can be transmitted to the second external device connected to the second interface through the above structure. As shown in FIG. 9, thin and solid lines represent the data transmission path.

In summary, the electronic device of embodiments of the present disclosure further includes the third switch unit capable of transmitting the network data with the transmission unit, the first switch unit, and the second network unit. When the electronic device is in different modes, the third switch unit, the second switch unit, and the first switch unit can cooperate to establish different data transmission paths between the network device and the external devices. Thus, the two external devices can be connected to the network device, or one of the external devices can be selected to be connected to the network device. In embodiments of the present disclosure, by switching the mode, the electronic device can realize the network connection requirement of the single external device and the network connection requirement of the plurality of external devices and can select the single external device that is connected to the network.

Figure 10:
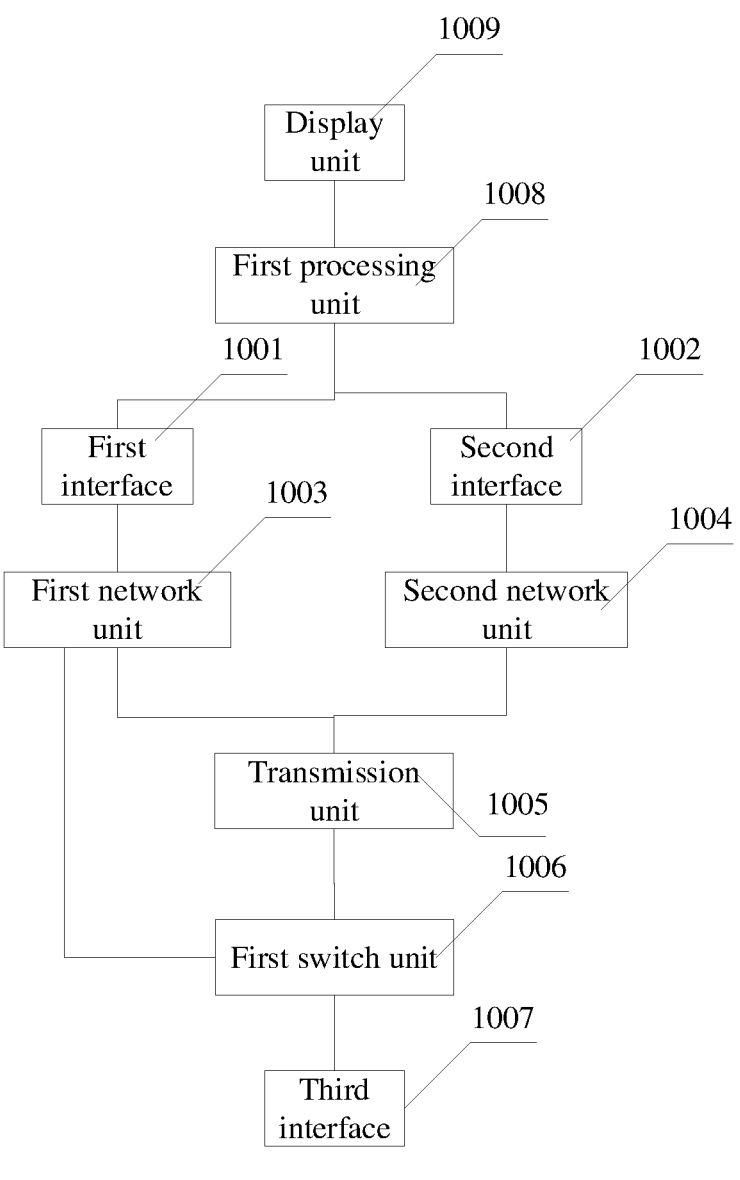
FIG. 10 illustrates a schematic structural diagram of an electronic device according to some embodiments of the present disclosure.

FIG. 10 illustrates a schematic structural diagram of an electronic device according to some embodiments of the present disclosure. The electronic device includes a first interface 1001, a second interface 1002, a first network unit 1003, a second network unit 1004, a transmission unit 1005, a first switch unit 1006, a third interface 1007, a first processing unit 1008, and a display unit 1009.

Functions of the first interface 1001, second interface 1002, first network unit 1003, second network unit 1004, transmission unit 1005, and third interface 1007 can be consistent with the corresponding structural functions above, which are not repeated here.

The first processing unit can be configured to convert the second portion of the first data and/or the second portion of the second data into the first display data and/or second display data.

The display unit can be configured to output the first display data and/or second display data.

The first portion of the first data and the first portion of the second data can be data transmitted to the network device. The second portion of the first data and the second portion of the second data may need to be displayed on the screen of the electronic device.

The second portion of the first data can be obtained through the first interface, while the second portion of the second data can be obtained through the second interface.

The first processing unit can be connected to the first interface and the second interface to obtain the second portion of the first data and the second portion of the second data from the first interface.

The first processing unit can obtain at least one of the second portion of the first data or the second portion of the second data.

When the display unit outputs the first display data and the second display data, the first display data and the second display data can be displayed in a picture-in-picture mode or a split-screen mode on the screen.

Figure 11:
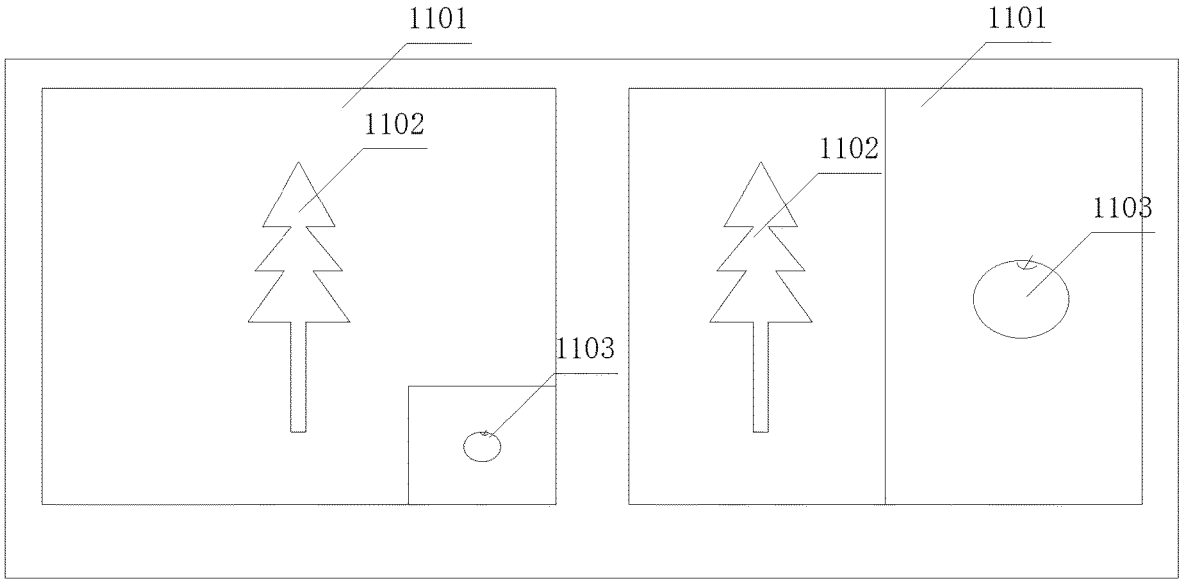
FIG. 11 illustrates a schematic diagram of a screen of the electronic device according to some embodiments of the present disclosure.

FIG. 11 illustrates a schematic diagram of a screen according to embodiments of the present disclosure. The screen 1101 can output the first display data 1102 and the second display data 1103 simultaneously. In the left image, the picture-in-picture mode is used. The first display data is displayed on a full screen, and a display area of the second display data is relatively small and blocks a portion of the display area of the first display data. In the right image, the split-screen mode is used. The first display data is displayed by occupying half of the screen, and the second display data is displayed by occupying the other half of the screen.

When the first processing unit obtains the second portion of the first data or the second portion of the second data, the first processing unit can convert the second portion of the first data or the second portion of the second data into the first display data or the second display data. Then, the display unit can output the first display data or the second display data.

When the display unit only outputs the first display data or the second display data, the first display data or the second display data can be displayed on the full screen or in a portion of the screen.

In some embodiments, if the display unit only outputs the first display data or the second display data in a portion of the screen, the size and position of the portion of the screen can be set as needed, which is not limited here.

When the electronic device is in different modes, the first external device and the second external device can be connected to the network. Accordingly, the second portion of the data of the external device connected to the network can be controlled to be converted into the display data to be displayed on the screen.

In summary, the electronic device of embodiments of the present disclosure can also include the first processing unit configured to convert the second portion of the first data and/or the second portion of the second data into the first display data and/or the second display data, and the display unit configured to output the first display data and/or the second display data. In embodiments of the present disclosure, the electronic device can further convert the second portion of the first data provided by the first external device and/or the second portion of the second data provided by the second external device into the display data and output the display data. According to the different modes in which the electronic device is, the first display data and/or the second display data can be displayed simultaneously or separately.

Figure 12:
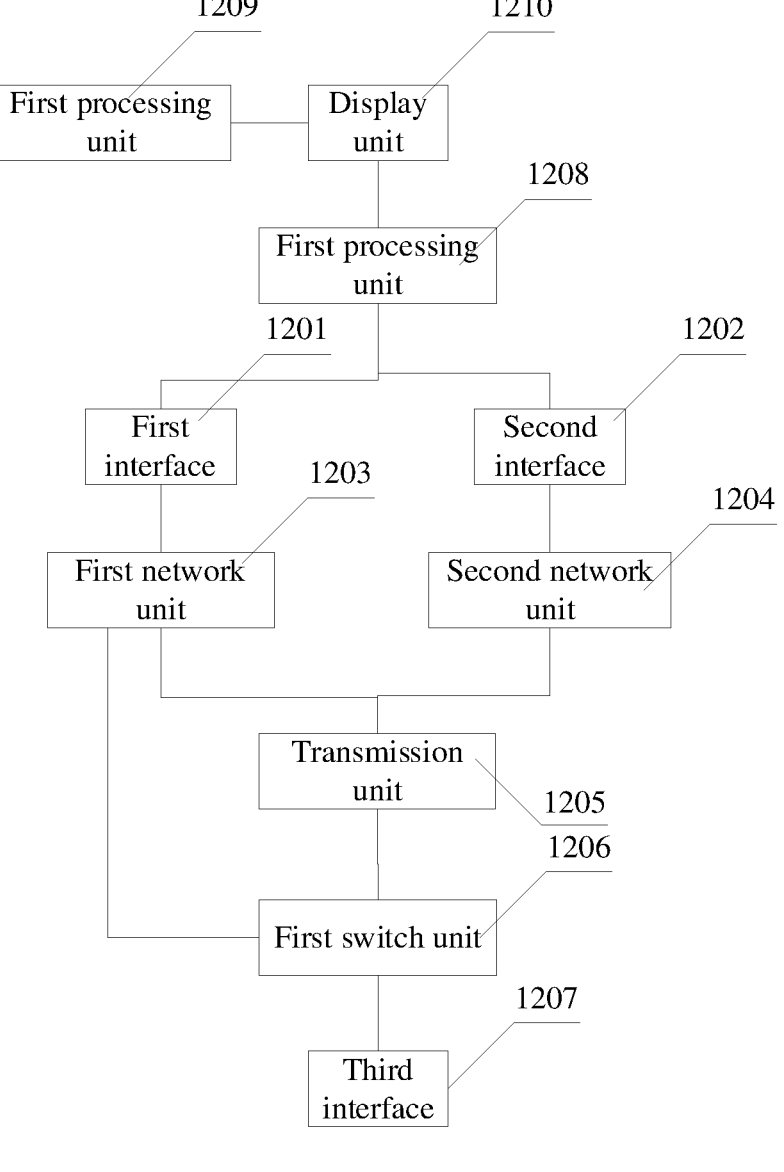
FIG. 12 illustrates a schematic structural diagram of an electronic device according to some embodiments of the present disclosure.

FIG. 12 illustrates a schematic structural diagram of an electronic device according to some embodiments of the present disclosure. This electronic device includes a first interface 1201, a second interface 1202, a first network unit 1203, a second network unit 1204, a transmission unit 1205, a first switch unit 1206, a third interface 1207, a first processing unit 1208, a second processing unit 1209, and a display unit 1210.

Functions of the first interface 1201, second interface 1202, first network unit 1203, second network unit 1204, transmission unit 1205, first switch unit 1206, third interface 1207, first processing unit 1208, second processing unit 1209, and display unit 1210 can be consistent with the structural functions above, which are repeated here.

The second processing unit can be configured to generate third display data. The third display data can be at least related to the mode switching of the electronic device.

The display unit can output the third display data for display, which affects the display of the first display data and/or the second display data.

The third display data can include display data including transmission channel options of the electronic device. Different transmission channel options can correspond to different modes of the electronic device.

In some embodiments, the transmission channel options can also include structures communicated to the switch units.

The third display data can also include display data prompting the mode of the electronic device or prompting switching from one mode to another mode.

When the electronic device automatically switches the mode, the second processing unit can be automatically triggered to generate the third display data based on the switching operation.

The second processing unit can generate the third display data based on received operation information. The operation information can be generated based on a specific operation. The specific operation can be used to call an on-screen display (OSD) menu. The OSD menu can be configured to display the current state of the electronic device.

In some embodiments, the third display data can be also displayed in the OSD menu. A user can switch the mode or determine the current mode of the electronic device based on the content displayed on the screen of the electronic device.

In some embodiments, the second processing unit and the first processing unit can have a same chip structure for implementing different functions, or different chip structures.

The display area of the third display data can overlap with the display area of the first display data/the second display data. The third display data can partially or fully block the first display data/the second display data.

In some embodiments, the area where the third display data is displayed can be opaque. The third display data can block the first display data/the second display data. In some other embodiments, the area where the third display data is displayed can be semi-transparent. The third display data can semi-transparently block the first display data/the second display data.

Figure 13:
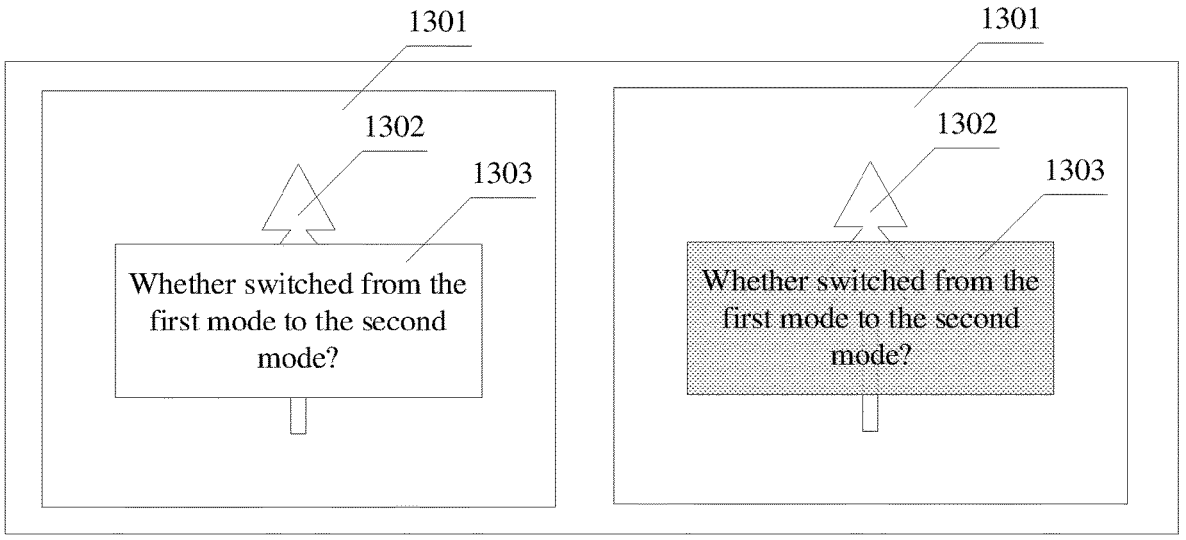
FIG. 13 illustrates a schematic diagram of a screen of the electronic device according to some embodiments of the present disclosure.

FIG. 13 illustrates a schematic diagram of a screen according to embodiments of the present disclosure. The screen 1301 can display the first display data 1302 and the third display data 1303. The first display data can occupy the full screen. On a left image, the third display data can semi-transparently block the first display data. In a right image, the third display data can block the first display data. The third display data can be "whether to switch from the first mode to the second mode?"

In summary, the electronic device of embodiments of the present disclosure can further include the second processing unit configured to generate the third display data. The third display data can be at least related to the mode switching of the electronic device. The display device can output the third display data for display, which affects the display of the first display data and/or the second display data. In some embodiments, the electronic device can further generate the third display data related to the mode switching of the electronic device. When the third display data is output at the display device, the display of the first display data and/or the second display data can be affected. Thus, the user of the electronic device can quickly see the third display data to know the information related to the mode switching of the electronic device.

Figure 14:
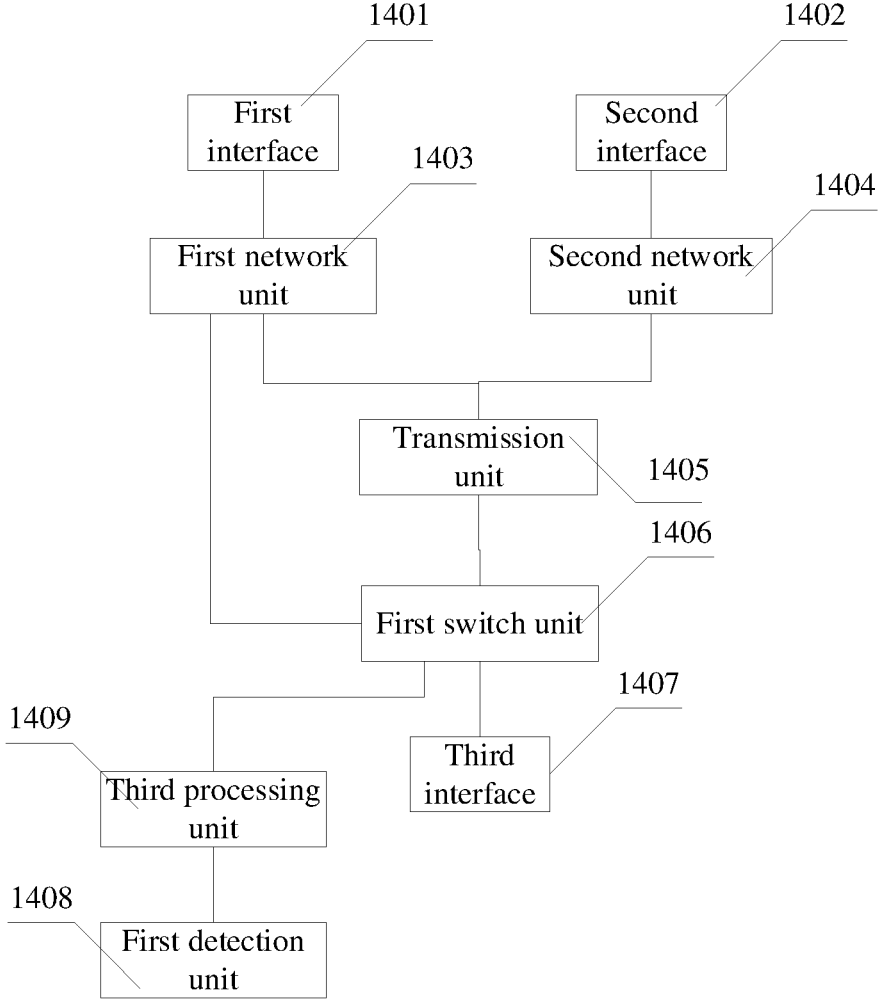
FIG. 14 illustrates a schematic structural diagram of an electronic device according to some embodiments of the present disclosure.

FIG. 14 illustrates a schematic structural diagram of an electronic device according to some embodiments of the present disclosure. This electronic device includes a first interface 1401, a second interface 1402, a first network unit 1403, a second network unit 1404, a transmission unit 1405, a first switch unit 1406, a third interface 1407, a first detection unit 1408, and a third processing unit 1409.

Functions of the first interface 1401, second interface 1402, first network unit 1403, second network unit 1404, transmission unit 1405, first switch unit 1406, and third interface 1407 can be consistent with the corresponding structural functions above, which are not repeated here.

The first detection unit can be configured to detect the state of the electronic device.

The third processing unit can be configured to determine whether the state satisfies a mode switching condition. If the mode switching condition is satisfied, the first switch unit can be at least triggered to cause the electronic device to switch the mode.

The mode switching of the electronic device can be performed based on whether the state of the electronic device satisfies the mode switching condition.

The mode switching condition can include a set of a plurality of conditions corresponding to switching to a certain mode, for example, a condition corresponding to switching to the first mode, a condition corresponding to switching to the second mode, and a condition corresponding to switching to the third mode.

In some embodiments, the state of the electronic device can include the state of the electronic device receiving the network data and/or a connection state and the remaining power state of the electronic device.

If the quality of the network data received by the electronic device is high, and the first external device and the second external device connected to the electronic device are able to process the network data, the electronic device can be controlled to transmit the network data to the two external devices. If the quality of the network data received by the electronic device is low, and the first external device and the second external device connected to the electronic device have different data processing capabilities, the electronic device can be controlled to transmit the network data to the external device with a stronger data processing capability to ensure that at least one external device can effectively process the network data.

The first detection unit can include a detection sub-unit. The detection sub-unit can be connected to the third interface and configured to detect the network data received by the electronic device.

The third processing unit can be connected to the detection sub-unit and configured to determine whether the network data satisfies a signal strength switch condition. If the signal strength switch condition is satisfied, at least the first switch unit can be triggered to cause the electronic device to switch the mode.

The signal strength of the network data can be determined based on a signal-to-noise ratio of the network data. When the signal-to-noise ratio is higher, the signal strength can be higher. When the signal-to-noise ratio is lower, the signal strength can be lower.

In some embodiments, if the signal strength of the network data is low, the first switch unit can be triggered to switch to the second mode. If the signal strength of the network data is high, the first switch unit can be triggered to switch to the first mode.

Figure 15:
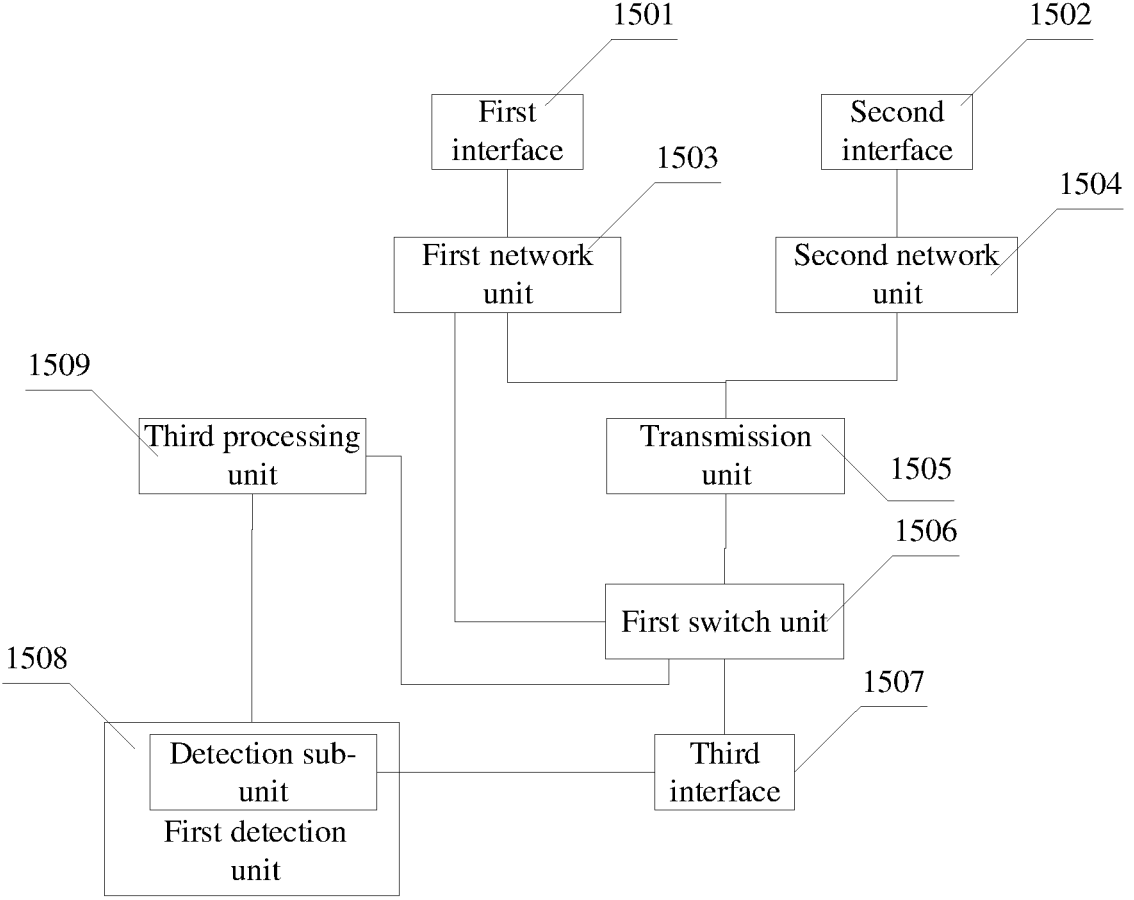
FIG. 15 illustrates another schematic structural diagram of the electronic device according to some embodiments of the present disclosure.

FIG. 15 illustrates another schematic structural diagram of the electronic device according to some embodiments of the present disclosure. The electronic device includes a first interface 1501, a second interface 1502, a first network unit 1503, a second network unit 1504, a transmission unit 1505, a first switch unit 1506, a third interface 1507, a first detection unit 1508, and a third processing unit 1509. The first detection unit 1508 can include a detection sub-unit. The detection sub-unit can be connected to the third interface and configured to detect the signal strength of the network data received by the third interface. The third processing unit can be configured to determine whether the first switch unit is triggered to switch the mode based on the signal strength of the network data. If the signal strength of the network data is low, and the electronic device is in the first mode, the first switch unit can be controlled to switch the unit structure connected to switch the electronic device to the second mode. If the signal strength of the network data is high, and the electronic device is in the first mode, the current mode can remain. The first switch unit may not switch the unit structure connected. If the signal strength of the network data is high, and the electronic device is in the second mode, the first switch unit can be controlled to switch the unit structure connected to switch the electronic device to the first mode. If the signal strength of the network data is low, and the electronic device is in the second mode, the current mode can remain. The first switch unit may not switch the unit structure connected.

If the second interface of the electronic device adopts a type-C interface, the electronic device can provide power to the first external device through the first interface.

In the operation of the electronic device, the electronic device can provide power to the second external device through the second interface using the type-C protocol. The battery power stored in the electronic device can gradually decrease. When the battery power falls below a battery power threshold, the functional unit of the electronic device can be affected. Then, the electronic device can be controlled to switch to the second mode, the data transmission with the electronic device can be stopped, and the electronic device can stop providing power to the second external device.

In some embodiments, the first detection unit can further include a battery power detection sub-unit configured to detect the remaining battery power of the electronic device. When the remaining battery power falls below the battery power threshold, the third processing unit can be triggered to switch the mode.

In some embodiments, when the electronic device also includes the second switch unit and the third switch unit, and the signal strength of the network data is low, the mode corresponding to an external device with the stronger signal processing capability can be selected based on the signal processing capability of the first external device and the signal processing capability of the second external device. If the signal processing capability of the first external device is strong, the electronic device can be switched to the second mode. If the signal processing capability of the second external device is strong, the electronic device can be switched to the third mode.

In some embodiments, when the electronic device also includes the second switch unit and the third switch unit, and the remaining battery power of the electronic device is below the battery power threshold, the power consumption of the first external device and the second external device connected to the first interface and the second interface can be determined. A mode corresponding to an external device with a higher power consumption can be selected. If the first external device consumes more power than the electronic device, the electronic device can be switched to the third mode. If the second external device consumes more power than the electronic device, the electronic device can be switched to the second mode.

In summary, the electronic device of embodiments of the present disclosure further includes the first detection unit configured to detect the state of the electronic device and a third processing unit configured to determine whether the state satisfies the mode switching condition. If the mode switching condition is satisfied, at least the first switch unit can be triggered to cause the electronic device to switch the mode. In some embodiments, the electronic device can also determine whether to switch the mode based on the state of the electronic device. Thus, the mode of the electronic device can be flexibly controlled according to the state of the electronic device to improve the flexibility of the electronic device.

Figures 16, 17:
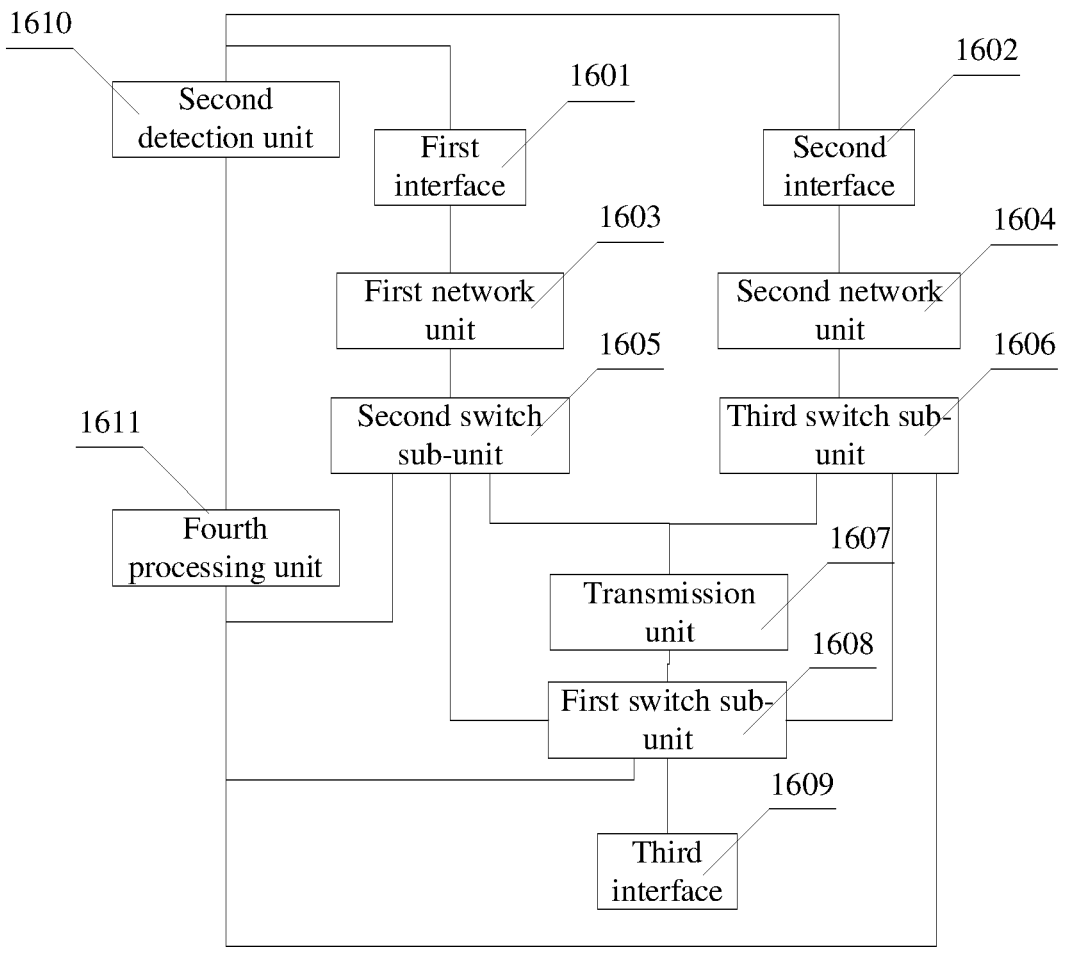
FIG. 16 illustrates a schematic structural diagram of an electronic device according to some embodiments of the present disclosure.
FIG. 17 illustrates a schematic flowchart of a mode switching method according to some embodiments of the present disclosure.

FIG. 16 illustrates a schematic structural diagram of an electronic device according to some embodiments of the present disclosure. The electronic device includes a first interface 1601, a second interface 1602, a first network unit 1603, a second network unit 1604, a second switch unit 1605, a third switch unit 1606, a transmission unit 1607, a first switch unit 1608, a third interface 1609, a second detection unit 1610, and a fourth processing unit 1611.

Functions of the first interface 1601, second interface 1602, first network unit 1603, second network unit 1604, second switch unit 1605, third switch unit 1606, transmission unit 1607, first switch unit 1608, and third interface 1609 can be consistent with the corresponding structural functions above, which are not repeated here.

The second detection unit can be connected to the first interface and the second interface and configured to detect the network data at the first interface and/or the second interface.

The fourth processing unit can be configured to control at least one of the first switch unit, the second switch unit, or the third switch unit to switch the mode of the electronic device when the network data detected at the first interface and/or the second interface does not satisfy the transmission condition. When the electronic device is in different modes, whether the network data detected by the second detection unit at the first interface and/or the second interface satisfies the transmission condition can be determined to determine a target unit. The target unit can include at least one of the first network unit, the second network unit, the first switch unit, or the transmission unit.

The transmission condition can include that the network data is detected at the interface.

If the network data is detected at the first interface, the network data transmitted from the network device can be transmitted to the first interface through the unit structures of the electronic device. If the network data is detected at the second interface, the network data transmitted from the network device can be transmitted to the second interface through the unit structures of the electronic device.

If the network data is not detected at the interface, and the network data can be transmitted to the interface theoretically in the mode in which the electronic device is, a failure can occur in one or more functional units involved in transmitting the network data to the interface.

In some embodiments, if the electronic device is in the first mode, and the network data detected at the first interface and the second interface does not satisfy the transmission condition, the unit structures connected to the electronic device can be switched by controlling the first switch unit, the second switch unit, and the third switch. Thus, the mode of the electronic device can be switched to the second mode or the third mode. If the electronic device is in the second mode, and the network data detected at the first interface can satisfy the transmission condition, and if the electronic device is in the third mode, and the network data detected at the second interface can satisfy the transmission condition, a failure can occur at the transmission unit. The transmission unit can be determined as the target unit.

In some embodiments, if the electronic device is in the first mode, and the network data detected at the first interface and the second interface does not satisfy the transmission condition, the unit structures connected to the electronic device can be switched by controlling the first switch unit, the second switch unit, and the third switch unit. Thus, the mode of the electronic device can be switched to the second mode or the third mode. If the electronic device is in the second mode, and the network data detected at the first interface does not satisfy the transmission condition, and if the electronic device is in the third mode, and the network data detected at the second interface does not satisfy the transmission condition, a failure can occur at the first switch unit. The first switch unit can be determined as the target unit.

In some embodiments, if the electronic device is in the first mode, and the network data detected at the first interface does not satisfy the transmission condition, while the network data detected at the second interface satisfies the transmission condition, a failure can be determined at the first network unit. The first network unit can be determined as the target unit.

In some embodiments, if the electronic device is in the first mode, and the network data detected at the second interface does not satisfy the transmission condition, while the network data detected at the first interface satisfies the transmission condition, a failure can be determined at the second network unit. The second network unit can be determined as the target unit.

In summary, the electronic device of embodiments of the present disclosure can further include the second detection unit configured to detect the network data of the first interface and/or the second interface and the fourth processing unit configured to control at least one of the first switch unit, the second switch unit, or the third switch unit to switch the mode of the electronic device when the network data detected at the first interface and/or the second interface does not satisfy the transmission condition. When the electronic device is in different modes, the fourth processing unit can be further configured to determine whether the network data detected by the second detection unit at the first interface and/or the second interface satisfies the transmission condition to determine the target unit. The target unit can include at least one of the first network unit, the second network unit, the first switch unit, the second switch unit, the third switch unit, or the transmission unit. In some embodiments, based on the connection methods of the units when the electronic device is in the different modes, which functional unit of the electronic device causes the network data detected at the first interface and/or the second interface to not satisfy the transmission condition can be determined. Thus, the function unit of the electronic device having a network failure can be identified.

Corresponding to the electronic device of embodiments of the present disclosure, embodiments of the present disclosure further provide a mode switching method applied to the electronic device.

FIG. 17 illustrates a schematic flowchart of a mode switching method according to some embodiments of the present disclosure. The method includes the following steps.

At S1701, a switch signal is obtained.

In some embodiments, the electronic device applying the method can include at least a first mode and a second mode.

When the electronic device is in the first mode, the first switch unit can transmit the network data with the first network unit and the second network unit through the transmission unit to allow the first external device and the second external device to be connected to the network device.

If the electronic device is in the second mode, the first switch unit can transmit the network data with the first network unit without through the transmission unit to allow the first external device to be connected to the network device, while the second external device cannot b connected to the network device.

For the structure of the electronic device, which applies the mode switching method of embodiments of the present disclosure, reference can be made to electronic device embodiments above, which are not described in detail here.

The switch signal can be generated by the electronic device or can be generated based on an external input operation.

In some embodiments, step S1701 includes receiving the input operation input by an input device and generating a first switch signal based on the input operation, and/or detecting the state of the electronic device, determining whether the state of the electronic device satisfies the mode switching condition, and generating the second switch signal if the mode switching condition is satisfied.

The electronic device can be connected to an input device. The input device can include a keyboard, a mouse, a touchscreen, etc.

The electronic device can include a display unit. The display unit can display at least the third display data related to the mode switching of the electronic device.

The input operation can be an operation performed based on the third display data output by the display unit.

The third display data can include the display data of the transmission channel options of the electronic device. Different transmission channel options can correspond to different modes of the electronic device.

In some embodiments, the transmission channel options can further include the structures communicating with the switch units.

Accordingly, the input operation can be a selection operation performed on the structural units communicating with the switch units output by the display unit, or a selection operation performed on the transmission channels output by the display unit.

The switch signal can be generated when the state of the electronic device satisfies the mode switching condition.

The state of the electronic device can include the state of the network data received by the electronic device and/or the connection state and the remaining battery power state of the electronic device.

In some embodiments, the state of the network data received by the electronic device can be obtained from the third interface connected to the network device.

If the state of the network data received by the electronic device changes, for example, from high quality to low quality or from low quality to high quality, the second switch signal can be generated.

If the electronic device provides power to the second external device connected to the electronic device during operation, the battery power stored in the electronic device can gradually decrease. When the battery power decreases below the battery power threshold, the function units of the electronic device can be affected. The electronic device can be controlled to generate the second switch signal.

At S1702, based on the switch signal, the first switch unit of the electronic device is at least controlled to cause the electronic device to at least switch between the first mode and the second mode.

Based on the switch signal, the switch unit of the electronic device can be controlled to perform switching. By controlling the structure units connected to the first switch unit to change, the electronic device can be switched between the first mode and the second mode.

If the electronic device includes the second switch unit, or the second switch unit and the third switch unit, the switch signal can be also used to control structure units connected to one or more of the second switch unit, or the second switch unit and the third switch unit. Thus, the electronic device can be switched between the first mode, the second mode, and the third mode.

After completing the mode switching, the display unit of the electronic device can also display a prompt message to indicate the current mode of the electronic device or the external device that is able to receive the network data from the network device.

Before the mode switching, the display unit of the electronic device can also display a prompt message to indicate the current mode of the electronic device and the mode about to be switched to, or the external device that is able to receive the network data from the network device corresponding to the current mode and the mode about to be switched.

The display unit of the electronic device can also display the first display data and/or second display data of the first external device and/or the second external device connected to the display unit.

Furthermore, when the display unit displays the prompt message and the first display data and/or the second display data, the display of the prompt message can affect the display of the first display data and/or the second display data.

The third display data can also include the display data that indicates the current mode of the electronic device, or the display data that indicates switching from one mode to another mode.

In summary, the mode switching method of embodiments of the present disclosure can include obtaining the switch signal, based on the switch signal, at least controlling the first switch unit of the electronic device to cause the electronic device to at least switch between the first mode and the second mode. The electronic device can at least include the first mode and the second mode. When the electronic device is in the first mode, the first switch unit can transmit the network data with the first network unit and the second network unit through the transmission unit to allow the first external device and the second external device to be connected to the network device. If the electronic device is in the second mode, the first switch unit can transmit the network data with the first network unit without through the transmission unit to allow the first external device to be connected to the network device, while the second external device cannot be connected to the network device. In some embodiments, when the electronic device is in different modes, the electronic device can be connected to different units based on the first switch unit. Thus, the two external devices can be connected to the network device, or only the first external device can be connected to the network device. The electronic device can be controlled to switch between different modes based on the switch signal to realize the network connection requirement of the single external device and the network connection requirement of the plurality of external devices.

Embodiments of the present disclosure are described in a progressive method. Each embodiment focuses on the differences from other embodiments Similar and identical parts of embodiments can be referred to each other. Since the method corresponds to the device of embodiments of the present disclosure, method embodiments are described simply. For the relevant parts, reference can be made to the description of the device.

The above description of embodiments of the present disclosure enables those skilled in the art to implement or use the present disclosure. Various modifications can be made to embodiments of the present disclosure. The modifications are obvious to those skilled in the art. The general principles defined in the present specification can be implemented in other embodiments without departing from the spirit or scope of the present disclosure. Therefore, the present disclosure is not limited to embodiments of the present disclosure but conforms to the widest scope consistent with the principles and novel features of the present disclosure.

What is claimed is:

1. An electronic device comprising:
a first interface connected to a first external device and configured to transmit first data;
a first network unit connected to the first interface and configured to convert a first portion of the first data and network data;
a second interface connected to a second external device and configured to transmit second data;
a second network unit connected to the second interface and configured to convert a first portion of the second data and the network data;
a transmission unit transmitting the network data with the first network unit and the second network unit;
a first switch unit transmitting the network data with the transmission unit and the first network unit;
a third interface connected to the first switch unit and configured to be connected to a network device;
wherein:
    the electronic device has at least a first mode and a second mode;
    in response to the electronic device being in the first mode, the first switch unit transmits the network data with the first network unit and the second network unit through the transmission unit to allow the first external device and the second external device to be connected to the network device; and
    in response to the electronic device being in the second mode, the first switch unit transmits the network data with the first network unit without through the transmission unit to allow the first external device to be connected to the network device, while the second external device cannot be connected to the network device.

2. The electronic device according to claim 1, further comprising:
a second switch unit transmitting the network data with the transmission unit, the first switch unit, and the first network unit;
wherein:
    in response to the electronic device being in the first mode, the first switch unit transmits the network data with the first network unit through the transmission unit and the second switch unit, and the first switch unit transmits the network data with the second network unit through the transmission unit to allow the first external device and the second external device to be connected to the network device; and
    in response to the electronic device being in the second mode, the first switch unit transmits the network data with the first network unit through the second switch unit and without through the transmission unit to allow the first external device to be connected to the network device, while the second external device is not able to be connected to the network device.

3. The electronic device according to claim 2, further comprising:
a third switch unit transmitting the network data with the transmission unit, the first switch unit, and the second network unit;
wherein:
the electronic device also has a third mode;
in response to the electronic device being in the first mode, the first switch unit transmits the network data with the first network unit through the transmission unit and the second switch unit, and the first switch unit transmits the network data with the second network unit through the transmission unit and the third switch unit to allow the first external device and the second external device to be connected to the network device; and
in response to the electronic device being in the third mode, the first switch unit transmits the network data with the second network unit through the transmission unit and the third switch unit, and the first switch unit and the transmission unit are not able to transmit the network data with the first network unit through the second switch unit to allow the second external device to be connected to the network device, while the first external device is not able to be connected to the network device.

4. The electronic device according to claim 1, further comprising:
a first processing unit configured to convert a second portion of the first data and/or a second portion of the second data into first display data and/or second display data; and
a display unit configured to output the first display data and/or second display data.

5. The electronic device according to claim 4, further comprising:
a second processing unit configured to generate third display data, the third display data being related to mode switching of the electronic device;
wherein the display unit outputs the third display data for display, which affects display of the first display data and/or the second display data.

6. The electronic device according to claim 1, further comprising:
a first detection unit configured to detect the state of the electronic device; and
a third processing unit configured to determine whether the state satisfies a mode switching condition, in response to the state satisfying the mode switching condition, at least the first switch unit being triggered to cause the electronic device to switch the mode.

7. The electronic device according to claim 6, wherein the first detection unit includes:
a detection sub-unit connected to the third interface and configured to detect the network data received by the electronic device; and
the third processing unit connected to the detection sub-unit and configured to determine whether the network data satisfies a signal strength switch condition, in response to the signal strength switch condition being satisfied, the first switch unit being at least triggered to allow the electronic device to switch the mode.

8. The electronic device according to claim 3, further comprising:
a second detection unit connected to the first interface and the second interface and configured to detect the network data at the first interface and/or the second interface; and
a fourth processing unit configured to control at least one of the first switch unit, the second switch unit, or the third switch unit to switch the mode of the electronic device based on the network data detected at the first interface and/or the second interface not satisfying the transmission condition, and when the electronic device is in different modes, determine whether the network data detected by the second detection unit at the first interface and/or the second interface satisfies the transmission condition to determine a target unit, the target unit including at least one a first network unit, the second network unit, the first switch unit, or the transmission unit.

9. A mode switching method comprising:
obtaining a switching signal;
based on the switching signal, controlling a first switch unit of an electronic device to allow the electronic device to be switched between a first mode and a second mode;
wherein:
the electronic device at least has a first mode and a second mode;
in response to the electronic device being in the first mode, the first switch unit transmits network data with a first network unit through a transmission unit to allow a first external device and a second external device to be connected to a network device; and
in response to the electronic device being in the second mode, the first switch unit transmits the network data with the first network unit without through the transmission unit to allow the first external device to be connected to the network device, while the second external device is not connected to the network device.

10. The method according to claim 9, wherein obtaining the switch signal includes:
receiving an input operation input by an input device and generating a first switch signal based on the input operation; and/or
detecting a state of the electronic device and determining whether the state of the electronic device satisfies a mode switching condition, and in response to satisfying the mode switching condition, generating a second switch signal.

11. The method according to claim 9, further comprising:
controlling a second switch unit to transmit the network data with the transmission unit, the first switch unit, and the first network unit;
wherein:
in response to the electronic device being in the first mode, the first switch unit transmits the network data with the first network unit through the transmission unit and the second switch unit, and the first switch unit transmits the network data with the second network unit through the transmission unit to allow the first external device and the second external device to be connected to the network device; and
in response to the electronic device being in the second mode, the first switch unit transmits the network data with the first network unit through the second switch unit and without through the transmission unit to allow the first external device to be connected to the network device, while the second external device is not able to be connected to the network device.

12. The method according to claim 11, further comprising:

controlling a third switch unit to transmit the network data with the transmission unit, the first switch unit, and the second network unit;

wherein:

the electronic device also has a third mode;

in response to the electronic device being in the first mode, the first switch unit transmits the network data with the first network unit through the transmission unit and the second switch unit, and the first switch unit transmits the network data with the second network unit through the transmission unit and the third switch unit to allow the first external device and the second external device to be connected to the network device; and in response to the electronic device being in the third mode, the first switch unit transmits the network data with the second network unit through the transmission unit and the third switch unit, and the first switch unit and the transmission unit are not able to transmit the network data with the first network unit through the second switch unit to allow the second external device to be connected to the network device, while the first external device is not able to be connected to the network device.

13. The method according to claim 9, further comprising:

converting a second portion of the first data and/or a second portion of the second data into first display data and/or second display data; and outputting the first display data and/or second display data.

14. The method according to claim 13, further comprising:

generating third display data, the third display data being related to mode switching of the electronic device;

wherein the display unit outputs the third display data for display, which affects display of the first display data and/or the second display data.

15. The method according to claim 9, further comprising:

detecting the state of the electronic device; and determining whether the state satisfies a mode switching condition, in response to the state satisfying the mode switching condition, at least the first switch unit being triggered to cause the electronic device to switch the mode.

16. The method according to claim 15, wherein detecting the state of the electronic device includes:

detecting the network data received by the electronic device; and determining whether the network data satisfies a signal strength switch condition, in response to the signal strength switch condition being satisfied, the first switch unit being at least triggered to allow the electronic device to switch the mode.

17. The method according to claim 16, wherein controlling the first switch unit of the electronic device to allow the electronic device to be switched between the first mode and the second mode includes:

detecting the network data at the first interface and/or the second interface; and controlling at least one of the first switch unit, the second switch unit, or the third switch unit to switch the mode of the electronic device based on the network data detected at the first interface and/or the second interface not satisfying the transmission condition, when the electronic device is in different modes, determining whether the network data detected by the second detection unit at the first interface and/or the second interface satisfies the transmission condition to determine a target unit, the target unit including at least one a first network unit, the second network unit, the first switch unit, or the transmission unit.

* * * * *